Jan. 17, 1967 A. F. MULLER ET AL 3,298,043

CONTROLLABLY ADJUSTABLE AUTOMOBILE BED-PLATFORM

Filed Oct. 26, 1964

INVENTORS.
ALBERT F. MULLER
JANICE A. MULLER 3,298,043
CONTROLLABLY ADJUSTABLE AUTOMOBILE
BED-PLATFORM
Albert F. Muller and Janice A. Muller, Baytown, Tex.
(both of 7713 Dublin St., Camp Springs, Md. 20023)
Filed Oct. 26, 1964, Ser. No. 406,393
1 Claim. (Cl. 5—118)

Generally speaking, the present invention relates to a controllably adjustable automobile bed-platform adapted to be mounted in a rear seat interior body portion of an automobile in a manner such as to extend substantially completely in a front-to-rear direction from a rear edge of an upstanding back portion of a front seat of the automobile to a front edge of an upstanding back portion of a rear seat of the automobile and to completely extend in a side-to-side direction between inside surface portions of side wall parts of the automobile body in a horizontal plane whereby to be substantially coextensive with the complete plan view area within the automobile body and behind the front seat thereof so as to effectively provide a means for supporting one or more infants thereon, usually with an intervening compressible mattress or pad carried on the upper surface of said horizontal bed-platform, so that the infant will be able to lie down and sleep, or the like, within the region defined at the bottom by said horizontal bed-platform (and such a compressible mattress positioned on the upper surface thereof) and the rear interior portion of the automobile body behind the front seat thereof.

An arrangement of the type referred to above is highly desirable since it makes it possible for a person to place one or more infants in the rear of an automobile on such a compressible mattress carried by the horizontal bed-platform and to then proceed with the driving of the automobile to a desired destination, either a close destination or a very remote destination, without the necessity of paying much attention to the infant thereafter since the infant will be safely confined to the desired rear region of the automobile and will be prevented from accidental or inadvertent injury which might normally occur if the infant should fall from an automobile seat to a floor portion thereof when the automobile moves erratically or with major elements of acceleration (either positive or negative and in any direction) during the course of the driving, turning, and stopping of the motor vehicle. In other words, it is extremely unlikely that the infant can be injured when so confined to the rear portion of the automobile upon the compressible mattress carried by the horizontal bed-platform of the present invention, and this makes it possible for the driver of the automobile to give virtually his entire attention to the operation of the automobile and virtually eliminates the distractions which the presence of an infant in a conventional automobile normally produces from time to time and which, in some circumstances may actually result in causing an automobile accident because of the momentary diverting of the driver's attention from the road.

Furthermore, it should be noted that small infants require a great deal of sleep and whenever a family intends to take a relatively long drive, it will normally be found that the infant will become tired after a relatively short period of time and will begin to cry, fret, and otherwise disturb the other occupants of the automobile when the infant is constrained or restricted in position or movement by being carried by some adult or by being positioned within any of the various types of restraining automobile seats for infants or the like.

However, such is not the case with the novel apparatus of the present invention which allows the infant a very large measure of freedom for movement within the rear interior region of the automobile behind the front seat thereof so that the infant is not so inclined to become fretful and upset because of such excessive restraint or constraint. Therefore, the infant is unlikely under such circumstances to cry and, additionally, the apparatus of the present invention is such that the infant can lie down at any location on the surface thereof and can go to sleep since any portion of the surface thereof will effectively act as a bed for the infant.

Various types of such rear seat bed-platforms for automobile interiors have been invented and developed heretofore. However, most of these have had major disadvantages of one type or another, such as the fact that they are normally not conveniently and easily controllably adjustable so as to be capable of being mounted within the rear seat part of the interior body portion of a great many different makes, styles, and/or sizes of automobiles. This has necessarily greatly limited the usefulness of such prior art devices, and it is a primary object of the present invention to provide such a controllably adjustable horizontal bed-platform which can be readily adjusted, both in a fore-and-aft direction and in a side-to-side direction for cooperation with respect to the differently sized interior rear seat automobile body parts of different makes, sizes, and/or styles of automobiles and with the bed-platform being provided with a plurality of underlying supporting leg means which are also adjustable to length, thus providing an arrangement which is readily adaptable for mounting within the interior rear portion of the automobile body of a great many different types, makes, and/or sizes of conventional automobiles. Indeed, we have found that it is possible to make one size of the apparatus of the present invention for such cooperation with virtually all standard conventional full size American makes automobiles. In the event that the apparatus of the present invention is to be used for so-called compact or midget cars or for certain small foreign cars, one additional size apparatus of the present invention may be employed for this purpose.

In other words, the novel apparatus of the present invention makes it possible to manufacture only one size (or at the very most two sizes) of the apparatus which will be adaptable for appropriate mounting within the interior of the rear seat portion of the automobile body of virtually all standard types of automobiles, which is highly advantageous since such minimizes the required range of sizes, reduces the over-all cost of manufacture, and greatly expands the potential usefulness of the apparatus of the present invention.

With the above points in mind, it is an object of the present invention to provide a novel controllably adjustable horizontal bed-platform for an automobile having the advantages referred to herein and including the features referred to herein, generically and/or specifically, and individually or in combination, and which is of extremely simple, inexpensive construction adapted for large-scale mass manufacture at very low cost whereby to be conductive to widespread use thereof.

Further objects are implicit in the detailed description which follows hereinafter (which is to be construed as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying single drawing sheet and is described in detail hereinafter.

FIG. 1 is a fragmentary, partially broken away, top plan view of the interior portion of an automobile body and particularly shows the rear part thereof between side walls of the automobile body and the upstanding back parts of the front and rear seats positioned within the automobile body. In other words, this view shows, in plan view, the interior rear region of the automobile body with the horizontal bed-platform of the present invention received and mounted therein and carrying a compressible mattress means on the upper surface thereof ready to receive an infant thereon.

FIG. 2 is a fragmentary side view, partly in elevation and partly in section, taken substantially along the plane indicated by the arrows 2—2 of FIG. 1.

FIG. 3 is an enlarged top plan view of the horizontal platform means of the present invention as it would appear in top plan view along the plane indicated by the arrows 3—3 of FIG. 2 below the level of the compressible mattress and with all portions of the automobile body removed for reasons of drawing simplification and clarity. In other words, this view actually comprises a top plan view of the horizontal platform means of the present invention by itself, and it is drawn to a larger scale than in FIG. 2.

Figure 1:
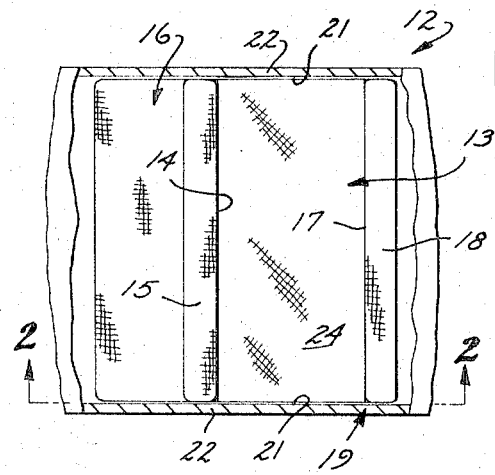
Figure 2:
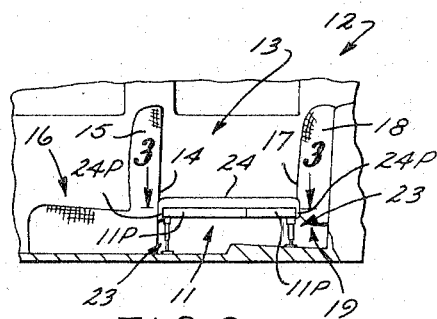

Generally speaking, the exemplary form of the invention illustrated may be said to comprise a horizontal platform means such as is generally designated at 11 and which is adjustable as to front-to-back length and as to side-to-side width into a plan view area configuration substantially entirely covering and coextensive with the available plan view area within the rear seat part of the interior body porton of a motor vehicle as is evident from a careful examination of FIGS. 1 and 2 wherein said motor vehicle is generally designated by the reference numeral 12 and the rear seat part of the interior body portion is generally designated by the reference numeral 13, as is best shown in FIG. 2. It will be noted that the horizontal platform means 11 is adjustable as mentioned above to fill the above-mentioned plan view area coextensive with said rear seat interior body portion or part 13 of the motor vehicle, whereby to cause said platform means 11 to extend substantially completely in a front-to-rear direction from the rear edge 14 of the upstanding back part 15 of a front seat, indicated generally at 16, of the automobile 12 to the front edge or surface 17 of the upstanding back part 18 of the rear seat, indicated generally at 19 (and partially removed in FIGS. 1 and 2) of the motor vehicle 12. It will also be noted that the horizontal platform means 11 is adjustable in a side-to-side direction, so as to extend from the one to the other of the inside surface portions 21 of the side wall parts 22 of the motor vehicle 12, as is best shown in FIG. 1, whereby to be substantially completely coextensive with the above-mentioned plan view area of the rear seat region 13.

The horizontal platform means 11 is positioned within said rear seat interior region 13 (after first removing the horizontal seat portion (not shown) of the rear seat fragmentarily shown at 19) and is supported in a substantially horizontal position in said rear seat interior region 13 at a desired height, as is best shown in FIG. 2, by means of a plurality of downwardly directed supporting leg means, generally designated at 23, which are controllably adjustable as to the vertical height thereof whereby to provide for such selective horizontal positioning of the horizontal platform means 11 at a desired height within the rear seat interior portion 13 of the motor vehicle body 12.

Then a compressible mattress or pad means, such as is designated at 24, is positioned over the upper surface of the horizontal platform means 11 whereby to effectively provide a combination protective covering and mattress means therefor. Additionally, in one exemplary form of the invention the mattress means 24 has a plan view area as great as, or slightly greater than, the maximum plan view area of the horizontal platform means 11 when adjusted into its maximum front-to-back length and its maximum side-to-side width, thus making it possible to tuck over and under the outer peripheral edge portions 24P of the compressible mattress 24 so as to lie between corresponding edge portions of the horizontal platform means 11 and the corresponding front and rear back wall seat parts 14 and 17 and corresponding side wall interior surface parts 21, thus effectively comprising peripheral space-filling edge gasket and locking means 24P completely filling in all small regions which otherwise might provide slight vertical openings and also positively and firmly locking the mattress 24 in place. This feature of the invention is clearly shown in FIG. 2 with respect to front and back edges of the horizontal platform means 11 and corresponding front and back edges of the mattress means 24. However, it should be clearly understood that a similar arrangement may exist with respect to side edges of the horizontal platform means 11 and corresponding side edges of the mattress means 24. In the exemplary form illustrated the mattress means 24 is adhesively fastened to the upper surface of the platfrom means 11 by adhesive means 24A. However various other fastening means may be employed, or in certain forms of the invention the mattress means may merely rest upon the platform means 11.

The above-described overlapping arrangement of the mattress means 24 may be eliminated in certain forms of the invention where a very close fit is achieved and no such folding down of mattress edge is required, and it should be noted that the present invention is intended to be broadly construed as including and comprehending such an arrangement.

The above-mentioned adjustable feature of the horizontal platform means 11 is caused by reason of the fact that said horizontal platform means 11 is effectively provided with front-to-rear telescopic engaging means effectively telescopically interconnecting side edge portions of the multiple panels comprising the horizontal platform means 11 for relative front-to-rear adjustment thereof for correspondingly varying the over-all front-to-rear length of the platform means 11, and is further caused by reason of the fact that said horizontal platform means is also provided with side-to-side telescopic engaging means effectively telescopically interconnecting front and rear edge portions of said multiple panels comprising said horizontal platform means for relative side-to-side adjustment thereof for correspondingly varying the over-all side-to-side width of said platform means.

In the exemplary form of the invention illustrated, the multiple panels of the horizontal platform means 11 are four in number and comprise four substantially rectangular overlapping horizontal platform panel members each of rigid thin-sheet material and designated by the reference numeral 11P.

In the exemplary form of the invention illustrated, the above-mentioned front-to-rear telescopic engaging means comprises two similar portions thereof, each generally designated at 25, while the above-mentioned side-to-side telescopic engaging means comprises two similar portions thereof, each generally designated at 25'.

Figure 5:
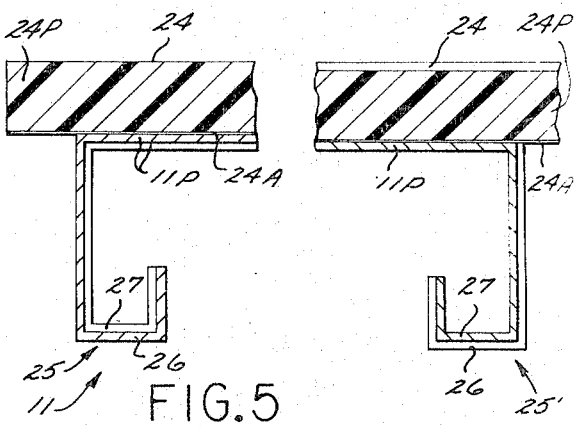
FIG. 5 is a fragmentary, enlarged, centrally broken away, sectional view of the horizontal platform means and mattress of the exemplary form of the present invention as it would appear when viewed along a plane such as is indicated by the arrows 5—5 of FIG. 3.

All four of said engaging means, comprising the two portions 25 and the two portions 25' are of substantially the same construction and, therefore, only the two shown at 25' are illustrated in detail, as shown in FIG. 5, since it is understood that the other two telescopic engaging means 25 are of similar construction and need no additional illustration and additional description, which would be substantial duplicates of that shown in FIG. 5 and described in detail hereinafter in connection with the two side-to-side telescopic engaging means 25'.

Figure 3:
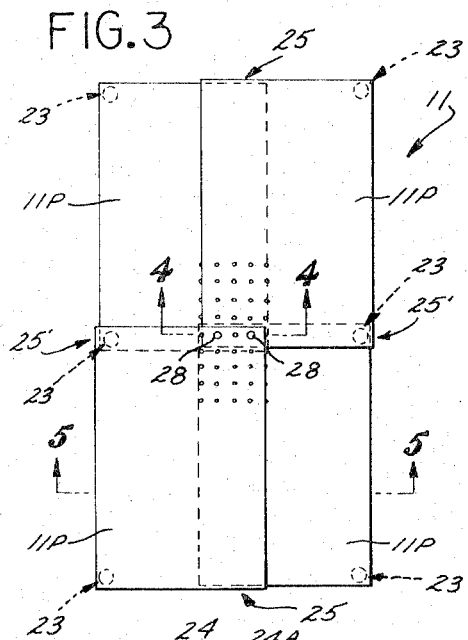

As is best shown in FIG. 5, each of said telescopic engaging means 25' comprises an outer curved substantially J-shaped channel member 26 and a cooperating correspondingly curved substantially J-shaped inner channel member 27 telescopically slidably mounted in said outer channel member 26 for relative movement therealong. In the case of the example illustrated in FIG. 5, said relative movement will be side-to-side relative movement, while in the case of the front-to-rear telescopic engaging means 25 of FIG. 3, such relative movement would be front-to-rear relative movement.

It will be understood that the inner and outer telescopically engaged channel members 26 and 27 overlap each other to a degree sufficient to provide for a range of extension movement to a maximum plan view size suitable for area-coextensive cooperation with substantially the complete interior region 13 of an automobile body 12 which is of the maximum size intended for use with the apparatus. The same is true with respect to the front-to-rear telescopic engaging means 25.

In other words, when the horizontal platform means 11 is to be mounted within a wide automobile interior region 13, the four panels 11P, which have their centrally positioned corner portions 11P' in vertically stacked but relatively slidable relationship, are relatively extended sidewardly so that each of the two side-to-side telescopic engaging means 25' is extended to substantially the maximum degree permissible without disengagement of the outer and inner channel members 26 and 27 occurring. Correspondingly, when the horizontal platform means 11 is to be positioned within an automobile interior body region 13 which is extremely long in a front-to-back direction between upstanding seat backs 15 and 18, said four panel portions 11P are relatively extended in a front-to-back relationship by extending the two front-to-rear telescopic engaging means 25 to the maximum permissible extent.

Figure 4:
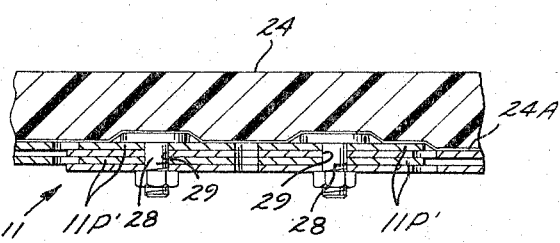
FIG. 4 is a fragmentary enlarged sectional view of the horizontal platform means and mattress of the exemplary form of the present invention as it would appear when viewed along a plane such as is indicated by the arrows 4—4 of FIG. 3.

In any case, after the various side-to-side and/or front-to-rear adjustments referred to above are accomplished, so as to properly fit the interior rear seat region 13 of the automobile body 12, the four panel members 11P are effectively locked in the adjusted relationship by threaded fastener means, such as indicated at 28 as best shown in FIG. 4, which extend through aligned sets of the plurality of holes or apertures 29 carried by the four panel members 11P. This permits a multi-step adjustment of the horizontal platform means 11 both in a front-to-rear relationship and a side-to-side relationship to exactly the desired optimum relationship for full area coextensive positioning within the corresponding rear seat interior region 13 of the automobile body 12.

Of course, the positioning of the horizontal platform means 11 within the interior rear seat region 13 of the automobile body 12 is such as to place the platform means 11 at the proper height and in a substantially horizontal relationship. This is accomplished by adjusting the vertical length of the six supporting leg means, indicated generally at 23, and locking them in the selected adjusted lengths my multiple-step locking means generally designated by the reference numeral 31 as best shown in FIG. 6 which exemplifies all of the six multiple step locking means.

Figure 6:
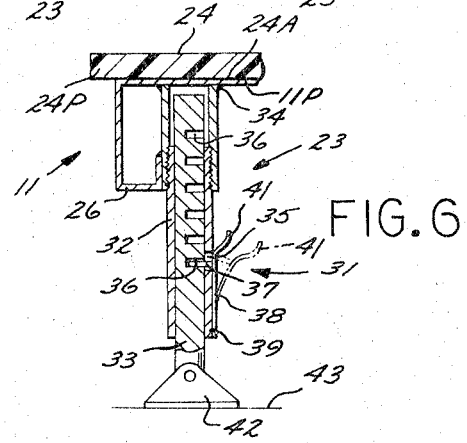
FIG. 6 is an enlarged fragmentary view, substantially in central vertical section, illustrating a typical one of the six similar telescopically extendable and shortenable supporting leg means underlying the horizontal platform means and adapted to support same above the interior floor surface of the rear portion of the automobile body.

As illustrated in FIG. 6, each of said vertically adjustable leg means 23 comprises a pair of telescopically controllably extendable engaged members 32 and 33, with the outer member 32 comprising a tubular member welded or otherwise affixed as indicated at 34 to the corresponding underneath portion of the corresponding panel member 11P, and with the other leg member 33 comprising a rod member slidably mounted within the tubular member 32 and with the exemplary multiple step locking means generally designated at 31 effectively being carried by both of said members 32 and 33 and comprising at least one aperture means 35 carried by the outer tubular member 33 and a plurality of apertures 36 carried by the inner rod member 33 and with an insert locking means 37 and biasing spring means 38 being resiliently attached in a cantilever fashion as indicated at 39 to the outer tubular member 32 for normal insertion of the insert locking means 33 through the aperture 35 and any one of the inner apertures 36 aligned therewith for locking the two telescopically engaged leg portions 32 and 33 in any of a plurality of different degrees of extended relationship. The insert locking means 37 can be controllably disengaged by grasping the projecting handle portion 41 and deflecting same outwardly from the solid line position in FIG. 6 into the broken line position shown in said figure, thus completely releasing the multiple step locking means 31 so that the leg means 23 can be extended to any desired length, after which the handle 41 is released and the multiple step locking means 31 is allowed to become re-engaged in locking relationship relative to the leg means 23. The leg means 23 may be provided with appropriate foot means 42 which may be of a self-leveling type and which may be of a compressible material for providing the maximum degree of firm engagement with the underlying floor surface 43 of the interior region 13 of the automobile body 12.

In the example illustrated, the compressible pad means 24, may be made of polyurethane foam material of one-inch thickness, for example, although not specifically so limited, or of any other suitable material having the desired characteristics of compressibility and resiliency, and also of washability, which is extremely important where infants are concerned.

In the example illustrated, the horizontal platform means is shown as being made of relatively thin-sheet steel material, say, of approximately .025 of an inch thickness, thus producing a relatively lightweight platform means capable of being easily handled. However, it should be noted that the invention is not specifically so limited and may be constructed of other suitable materials.

For illustrative purposes only, it is pointed out that the front-to-rear adjustment of the horizontal platform means may be of approximately 11 inches extent, ranging from, say, a minimum of 31 inches to a maximum of 42 inches, although not specifically so limited, while the side-to-side adjustment of the horizontal platform means may be of approximately 10 inches extent, ranging from, say, a minimum of 54 inches to a maximum of 64 inches, although not specifically so limited. These dimensional values are given merely for exemplary purposes and are not to be construed as specifically limiting the invention to the particular range of dimensional values just given, which may be modified in accordance with variations in the corresponding dimensions of the interior parts of various automobiles subsequently manufactured, and as desired under any circumstances of use for the purposes outlined hereinbefore.

It should be noted that the controllably adjustable automobile platform means of the present invention need not, in all forms thereof, comprise four panel members having front-to-rear and side-to-side telescopic engaging means at the outer edges thereof in the manner of the specific exemplary form of the invention illustrated in FIGS. 1–6 and described in detail hereinbefore. Actually, various other constructions for such a horizontal platform means allowing effective controllable front-to-rear and side-to-side adjustment of the size thereof may be employed in lieu of the specific arrangement described in detail hereinbefore and illustrated in the drawing.

For example, an arrangement wherein the horizontal platform means is hinged at the center and is provided with three substantially U-shaped slidable metal boxes at the edges thereof which can be controllably locked in various positional relationships, will make it possible to adjust the fore-and-aft and side-to-side over-all dimensions of the platform means, and yet will make it possible to remove said slidable metal boxes from the hinged central portion which can then be folded into a much smaller size for convenient storage and easy portability. Said hinged central portion in this arrangement may be made of wood or of any other suitable material. Also, as an alternate arrangement, the horizontal platform means may be made of slidable tubular frame construction carrying a canvas cover or the like in a manner similar to a cot. This will make it possible for fore-and-aft and side-to-side size adjustment and, in certain forms, will make it possible to disassemble the tubular framework and/or cover for storing the device in a very small space volume. Alternatively, a laminated plastic construction may be employed which might comprise a "sandwich" material having an expanded plastic foam central layer laminated top and bottom with tension and compression plastic layers which are not made of foam material but which are preferably made of relative dense, high strength plastic material. In this type of arrangement, the platform means may be centrally hinged with suitable plastic hinges or the like, if desired, and the entire device may be cut to size with a hot wire saw which will cut through the edges of the laminated plastic horizontal platform means readily when electrically heated, thus making it possible to cut the platform means to the exact size required for the interior rear seat portion of a particular automobile body.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

A controllably adjustable horizontal bed-platform for mounting in a rear seat interior body portion of a motor vehicle, comprising: horizontal platform means adjustable as to front-to-back length and as to side-to-side width into a plan view area configuration substantially entirely covering and coextensive with the available plan view area within the rear seat part of the interior body portion of an automobile whereby to cause said platform means to extend substantially completely in a front-to-rear direction from the rear edge of an upstanding back part of a front seat of the automobile to a front edge of an upstanding back part of a rear seat of the automobile and to extend in a side-to-side direction between inside surface portions of side wall parts of the automobile, said platform means being provided with a plurality of downwardly directed supporting leg means, each controllably adjustable as to the vertical height thereof and cooperable with underlying floor portions of the rear seat part of the interior body portion of the automobile for supporting said platform means thereover in a substantially horizontal position; and compressible pad means covering the upper surface of said platform means and downwardly curvedly overlapping the edges thereof whereby to effectively provide a combination protective covering and mattress means therefor and an effective peripheral space-filling edge gasket and locking means therefor; said horizontal platform means comprising four substantially rectangular partially overlapping horizontal platform panel members, each of rigid thin-sheet material, and including front-to-rear telescopic engaging means effectively telescopically interconnecting side edge portions of said panel members for relative front-to-rear adjustment thereof for correspondingly varying the over-all front-to-rear length of said platform means, and side-to-side telescopic engaging means effectively telescopically interconnecting front and rear, side-to-side directed, edge portions of said panel members for relative side-to-side adjustment thereof for correspondingly varying the over-all side-to-side width of said platform means; each telscopic engaging means comprising an outer curved substantially J-shaped channel member and a cooperating correspondingly curved substantially J-shaped inner channel member telescopically slidably mounted in said outer channel member for relative movement therealong; each of said four panel members having an inner substantially centrally positioned corner portion slidably mounted in a four-layer stacked relationship relative to the remaining three corner portions of the corresponding three other panel members; and locking fastener means and corresponding multiple alignment aperture means carried by the various slidably adjustable panel members for controllable relative interlocking and effective immobilization thereof in any selected adjusted position within the range of permissible adjustment steps thereof; each of said leg means comprising a pair of telescopically controllably extendably engaged members and multiple step locking means for relatively locking said engaged members in any of a plurality of different degrees of relative extension thereof, said multiple step locking means comprising a plurality of vertically spaced apertures carried by one of said telescopically engaged members and at least one aperture carried by the other one of said telescopically engaged members and insert locking means provided with biasing spring means normally biasing same into inserted locking relationship relative to any pair of aligned apertures.

References Cited by the Examiner
UNITED STATES PATENTS

| | | | |
|---|---|---|---|
| 1,306,614 | 6/1919 | Novick | 5—181 X |
| 1,503,391 | 7/1924 | Teske | 5—311 |
| 2,641,773 | 6/1953 | Kramer | 5—94 |
| 2,649,593 | 8/1953 | Kirsten | 5—94 X |
| 2,650,374 | 9/1953 | Pierce | 5—94 X |
| 2,696,246 | 12/1954 | Putnam | 5—94 X |

FRANK B. SHERRY, *Primary Examiner.*

R. D. KRAUS, *Assistant Examiner.*